United States Patent
Tam

(10) Patent No.: US 7,247,217 B2
(45) Date of Patent: Jul. 24, 2007

(54) VACUUM AND FLUID-PRESSURE METHOD FOR HELMET CONSTRUCTION

(76) Inventor: Chit Ho Tam, Unit 1-6, 1/F., Block 3 Nan, Fung Industrial City, 18 Tin Hau Road, Tuen Mun, N.T., Hong Kong (CN)

( * ) Notice: Subject to any disclaimer, the term of this patent is extended or adjusted under 35 U.S.C. 154(b) by 532 days.

(21) Appl. No.: 10/920,959

(22) Filed: Aug. 18, 2004

(65) Prior Publication Data

US 2005/0183812 A1  Aug. 25, 2005

(30) Foreign Application Priority Data

Feb. 23, 2004  (CN) .................. 2004 1 0015423

(51) Int. Cl.
  *B29C 65/48* (2006.01)
(52) U.S. Cl. .............. 156/286; 156/285; 156/382; 264/570; 264/571
(58) Field of Classification Search ............... None
  See application file for complete search history.

(56) References Cited

U.S. PATENT DOCUMENTS 2,363,933 A * 11/1944 Bendix .................. 144/348
3,568,210 A * 3/1971 Marietta .................. 2/413
6,156,403 A * 12/2000 Cochran .................. 428/58
6,389,594 B1 * 5/2002 Yavin .................. 2/2.5

* cited by examiner

*Primary Examiner*—Jessica Ward
(74) *Attorney, Agent, or Firm*—Stephen B. Salai, Esq.; Brian B. Shaw, Esq.; Harter Secrest & Emery LLP

(57) ABSTRACT

A method for helmet construction by applying vacuum and fluid-pressure technologies is disclosed. Different types and sizes of exterior and interior helmet shells are press-formed from general engineering plastics. Conventional adhesive is applied on the inside surface of the exterior shell for fastening the interior and exterior shells together to form an integral shell unit. The shell unit is set on the base of a vacuuming apparatus moulded to adapt and to receive the inside surface contour of the interior shell. The vacuuming apparatus and the shell unit setting thereon are placed inside a conventional plastic film bag for vacuuming clear of any air pockets in the space between the two shell layers. The vacuumed film bag containing the vacuuming apparatus and the shell unit is then submerged under heated fluid contained in an airtight and pressure-resistant vessel. Pressure is subsequently applied to the vessel to further pressurize and complete the fastening process of the interior and exterior shells. Helmet construction according to this method requires low operating temperature and low operating pressure, thus enabling the use of relatively inexpensive and easily sourced raw materials.

11 Claims, No Drawings

VACUUM AND FLUID-PRESSURE METHOD FOR HELMET CONSTRUCTION

CROSS-REFERENCE TO RELATED APPLICATIONS

This application claims priority from Chinese Application No. 200410015423.7, filed on Feb. 23, 2004.

BACKGROUND OF THE INVENTION

Helmets in general are made up of an interior shell and an exterior shell fastened together. In the conventional methods of helmet construction, the exterior shell is usually formed first, and high-temperature-resistant printing ink is coated on the inside surface of the exterior shell. The exterior shell is then placed inside a hot-press mould capable of injecting plastic particles. Under high temperature and pressure, injected plastic particles thaw, froth and expand into firm and light interior shell, which tightly presses against the exterior shell. Since this type of conventional helmet construction process requires high heat and pressure, materials for the exterior shells and coating ink must be high-heat-resistant, high-pressure-resistant and distortion-resistant. Generally, polycarbonate (PC) and high-grade plastic are used as raw materials for exterior shells. High-temperature-resistant printing ink is used as adhesive for fastening the interior and exterior shells. Thus, these raw materials are expensive and the coefficient of adhesion between interior and exterior shells is unsatisfactory. Other shortcomings in the conventional method include complex operating techniques, requirement for high precision of mould matching, short usage life, long production cycle and expensive manufacturing cost.

It is therefore desirable to construct helmets without the foregoing disadvantages.

SUMMARY OF THE INVENTION

This invention overcomes the above shortcomings and provides a method to construct helmet by using vacuum and fluid-pressure.

An object of the present invention is to use low cost raw materials to produce interior and exterior shells and to apply airtight vacuuming to eliminate air pockets between the fastened interior and exterior shells and to apply fluid pressure to enhance fastening of the two helmet shells. The inventive method requires only low operating temperature and pressure, and provides uniform pressure on the interior and exterior shell. It also enhances adhesion effectiveness, shortens production cycle and lowers manufacturing cost.

According to one aspect of the invention, it provides a method for constructing helmet comprising the steps of (a) press-forming an interior shell and an exterior shell from general engineering plastics; (b) applying conventional adhesive to the inside surface of the exterior shell to fasten the interior and exterior shells together to form an integral shell unit; (c) setting the integral shell unit on the base of a vacuuming apparatus in which the base is formed to adapt and to receive the inside of the interior shell and is provided with apertures evenly distributed on the surface of the base and wherein the apertures are connected to a vacuum means; (d) placing the vacuuming apparatus and the shell unit setting on the base thereon inside a plastic or rubber film bag and vacuuming clear of any air pockets in the space between the two shell layers; (e) submerging the vacuumed film bag containing the vacuuming apparatus and the shell unit under fluid contained in an airtight and pressure-resistant vessel; (f) applying pressure at between 0.01-1 Mpa to the vessel and maintaining fluid temperature at between 10° C.-99° C. for 2-60 seconds to further pressurize the fastening process of the interior and exterior shells; and (g) releasing the inside pressure of the vessel and turning off the vacuum applied to the sealed vacuumed film bag containing the vacuuming apparatus and the shell unit and taking the vacuuming apparatus and the shell unit out of the fluid and retrieving the shell unit from the film bag.

According to another aspect of the invention, it provides a method for constructing helmet comprising the steps of (a) press-forming an interior shell and an exterior shell from general engineering plastics; (b) applying conventional adhesive to the inside surface of the exterior shell to fasten the interior and exterior shells together to form an integral shell unit; (c) placing the integral shell unit inside a plastic or rubber film bag and sealing the whole of the film bag tightly with only an opening left for a vacuum tubing connected to a vacuum means; (d) turning on the vacuum means and vacuuming clear of any air pockets in the space between the two shell layers; (e) submerging the vacuumed film bag containing the shell unit under fluid contained in an airtight and pressure-resistant vessel; (f) applying pressure at between 0.01-1 Mpa to the vessel and maintaining fluid temperature at between 10° C.-99° C. for 2-60 seconds to further pressurize the fastening process of the interior and exterior shells; and (g) releasing the inside pressure of the vessel and turning off the vacuum applied to the sealed vacuumed film bag containing the shell unit and taking the shell unit out of the fluid and retrieving the shell unit from the film bag.

DETAILED DESCRIPTION OF THE INVENTION

According to the present invention, different types and sizes of exterior and interior helmet shells are press-formed from general engineering plastics. A conventional adhesive, such as white latex glue or non-drying glue, is coated, sprayed or spread evenly on the inside surface of the exterior shell. Thereafter, the interior shell is pressed against the exterior shell so as to be fastened together to form an integral shell unit.

The shell unit is set on the base of a vacuuming apparatus. The vacuuming apparatus base is moulded to adapt and to receive the inside surface contour of the interior shell such that the shape of the upper surface of the base corresponds substantially to the shape of the inside surface of the interior shell. Vacuuming apertures are distributed evenly on the surface of the base. The apertures are connected to vacuum cavities inside the base. The lower portion of the vacuum cavities are equipped with stop-reverse sealed valves and vacuum tubing for connecting to a vacuum suction pump.

The integral shell unit comprising of the exterior and interior shells and setting at the base of the vacuuming apparatus thereon is placed inside a conventional plastic or rubber film bag. The whole of the film bag is sealed tightly with the only opening for the vacuum tubing connecting to the stop-reverse sealed valves to operatively communicate with the vacuum suction pump. When the vacuum is turned on, the air inside the film bag together with any air pockets which may have been left in the space between the two shell layers are eliminated via the apertures evenly distributed on the surface of the base through the vacuum cavities and the stop-reverse sealed valves and vacuum tubing. The interior and exterior shells thus adhere firmly to one another under airtight vacuuming.

Alternatively, the invention can do away with placing the integral shell unit on the base of a vacuuming apparatus. Instead, the shell unit is placed directly into a conventional plastic or rubber film bag. The whole of the film bag is sealed tightly with the only opening for a vacuum tubing connecting to stop-reverse sealed valves to operatively communicate with a vacuum suction pump and the film bag. When the vacuum is turned on, the air inside the film bag together with any air pockets which may have been left in the space between the two shell layers are eliminated via the stop-reverse sealed valves and the vacuum tubing. The interior and exterior shells thus adhere firmly to one another under airtight vacuuming.

In order to further enhance and reinforce maximum adhesion of the interior and exterior shells after the shell unit underwent airtight vacuuming, the vacuumed film bag containing the vacuuming apparatus and the shell unit is submerged under heated water, oil or other suitable fluids contained in an airtight and pressure-resistant vessel. After the vessel is sealed, the internal pressure is applied at between 0.01-1 Mpa and the temperature is maintained at between 10° C.-99° C. for 2-60 seconds to further pressurize and complete the fastening process of the interior and exterior shells.

At the end of the fluid-pressure treatment, the inside pressure of the vessel is released and the vacuum applied to the sealed vacuumed film bag containing the vacuuming apparatus and the shell unit is turned off and the film bag is taken out from the fluid. The newly constructed helmet is subsequently retrieved from the film bag.

The method of the present invention for constructing helmets using vacuum and fluid-pressure technologies can be illustrated by the following two examples:

EXAMPLE 1

Step (a) - Fastening the Exterior and Interior Shells Once the exterior and interior shells are made from general engineering plastics, white latex glue is spray-coated on the inside surface of the exterior shell. The interior shell is then pressed against the inside surface of the exterior shell to enable the two shells to be fastened together as an integral shell unit.

Step (b) - Airtight Vacuuming with Vacuuming Apparatus and Film Bag. The shell unit is set on the base of a vacuuming apparatus. The upper surface of the base of the vacuuming apparatus is moulded to better adapt and receive the inside surface contour of the interior shell. Preferably, the shape of the base surface corresponds substantially to the shape of the inside surface of the interior shell. Vacuuming apertures are distributed evenly on the surface of the base. The apertures are connected to vacuum cavities located inside the base. The lower portion of the vacuum cavities are equipped with stop-reverse sealed valves and vacuum tubing for connecting to a vacuum pump.

The integral shell unit which comprises the exterior and interior shells and setting at the base of the vacuuming apparatus thereon is placed inside a rubber film bag. The film bag with the contents entrapped therein is sealed tightly with only one opening for the vacuum tubing connecting to the stop-reverse sealed valves to operatively communicate with the vacuum suction pump. The vacuum is then turned on to suction out the air inside the film bag, plus any air pockets which may have been left in the space between the two shell layers.

Step (c) - Applying Fluid-Pressure. The vacuumed film bag containing the vacuuming apparatus and the shell unit is then submerged under heated water contained in an airtight and pressure-resistant vessel. After the vessel is sealed, the pressure inside the vessel is set at 0.25 Mpa and the temperature is maintained at 60° C. for 10 seconds.

Step (d) - Retrieving the Helmet Shell Unit. At the end of the fluid-pressure treatment, the inside pressure of vessel is released and the vacuum applied to the sealed vacuumed film bag containing the vacuuming apparatus and the shell unit is turned off and the film bag is taken out from the 60° C. water. The newly constructed helmet is subsequently retrieved from the film bag.

EXAMPLE 2

Step (a) - Fastening the Exterior and Interior Shells. Once the exterior and interior shells are made from general engineering plastics, white non-drying glue is spray-coated on the inside surface of the exterior shell. The interior shell is then pressed against the inside surface of the exterior shell to enable the two shells to be fastened together as an integral shell unit.

Step (b) - Airtight Vacuuming with Film Bag. The shell unit is placed inside a plastic film bag. The whole of the film bag is sealed tightly with the only opening for a vacuum tubing connected to stop-reverse sealed valves to operatively communicate with a vacuum suction pump and the film bag. When the vacuum is turned on, the air inside the film bag together with any air pockets which may have been left in the space between the two shell layers are eliminated via the stop-reverse sealed valves and the vacuum tubing.

Step (c) - Applying Fluid-Pressure. The vacuumed film bag containing the shell unit is then submerged under heated oil contained in an airtight and pressure-resistant vessel. After the vessel is sealed, the pressure inside the vessel is set at 0.2 Mpa and the temperature is maintained at 50° C. for 6 seconds.

Step (d) - Retrieving the Helmet Shell Unit. At the end of the fluid-pressure treatment, the inside pressure of vessel is released and the vacuum applied to the sealed vacuumed film bag containing the shell unit is turned off and the film bag is taken out from the 60° C. oil. The newly constructed helmet is subsequently retrieved from the film bag.

Since the helmet construction method according to the present invention requires only low operating temperature and low operating pressure, it enables the use of low cost raw materials which can be widely and easily sourced.

It is to be understood that the embodiments depicted in the patent specification herein are intended to be merely illustrative and not restrictive in any sense. It is to be further understood that the present invention may be carried out in other specific way than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A method for constructing a helmet comprising the steps of:

(a) press-forming an interior shell and an exterior shell from general engineering plastics;

(b) applying conventional adhesive to the inside surface of the exterior shell to fasten the interior and exterior shells together to form an integral shell unit;

(c) placing said shell unit inside a plastic or rubber film bag and sealing the whole of the film bag tightly with only an opening left for a vacuum tubing connected to a vacuum means;

(d) turning on said vacuum means and vacuuming clear of any air pockets in the space between the two shell;

(e) submerging the vacuumed film bag containing the shells unit under fluid contained in an airtight and pressure-resistant vessel;

(f) applying pressure at between 0.01-1 Mpa to said vessel and maintaining fluid temperature at between 10° C.-99° C. for 2-60 seconds to further pressurize the fastening process of the interior and exterior shells; and (g) releasing the inside pressure of said vessel and turning off the vacuum applied to said sealed vacuumed film bag containing the shell unit and taking the shell unit out of the fluid and retrieving the shell unit from the film bag.

2. The method for constructing a helmet according to claim 1, wherein said vacuum means in Step (c) comprises a vacuum tubing equipped with stop-reverse sealed valves to operatively communicate with a vacuum pump and said film bag.

3. The method for constructing a helmet according to claim 1, wherein said adhesive in Step (b) is applied by means of spray coating or spreading.

4. The method for constructing a helmet according to claim 1, wherein said fluid inside said vessel used in Step (e) is either water or oil.

5. The method for constructing a helmet according to claim 1, wherein the vessel pressure to be applied in Step (f) is 0.2 Mpa and the temperature of the fluid is heated to 50° C. for 6 seconds.

6. A method for constructing a helmet comprising the steps of:

(a) press-forming an interior shell and an exterior shell from general engineering plastics;

(b) applying conventional adhesive to the inside surface of the exterior shell to fasten the interior and exterior shells together to form an integral shell unit;

(c) setting said shell unit on the base of a vacuuming apparatus, said base is formed to adapt and to receive the inside of the interior shell and is provided with apertures evenly distributed on the surface of said base, wherein said apertures are connected to a vacuum means;

(d) placing said vacuuming apparatus and said shell unit setting on the base thereon inside a plastic or rubber film bag and vacuuming clear of any air pockets in the space between the two shell layers;

(e) submerging the vacuumed film bag containing the vacuuming apparatus and the shell unit under fluid contained in an airtight and pressure-resistant vessel;

(f) applying pressure at between 0.01-1 Mpa to said vessel and maintaining fluid temperature at between 10° C.-99° C. for 2-60 seconds to further pressurize the fastening process of the interior and exterior shells; and (g) releasing the inside pressure of said vessel and turning off the vacuum applied to said vacuumed film bag containing the vacuuming apparatus and the shell unit and taking the vacuuming apparatus and the shell unit out of the fluid and retrieving the shell unit from the film bag.

7. The method for constructing a helmet according to claim 6, wherein said vacuum means in Step (c) comprises vacuum cavities located inside said base and a lower portion of said vacuum cavities are equipped with stop-reverse sealed valves and vacuum tubing for connecting to a vacuum pump.

8. The method for constructing a helmet according to claim 6, wherein said adhesive in Step (b) is applied by means of spray coating or spreading.

9. The method for constructing a helmet according to claim 6, wherein said fluid inside said vessel used in Step (e) is either water or oil.

10. The method for constructing a helmet according to claim 6, wherein the vessel pressure to be applied in Step (f) is 0.25 Mpa and the temperature of the fluid is heated to 60° C. for 10 seconds.

11. The method for constructing a helmet according to claim 6, wherein the surface of said base in Step (c) is moulded to substantially correspond to a contour of the inside surface of the interior shell in order to better adapt and receive the inside surface contour of said interior shell.

* * * * *